J. C. Fish.
Tree-Feeding Tube.
N° 73442. Patented Jan. 21, 1868.
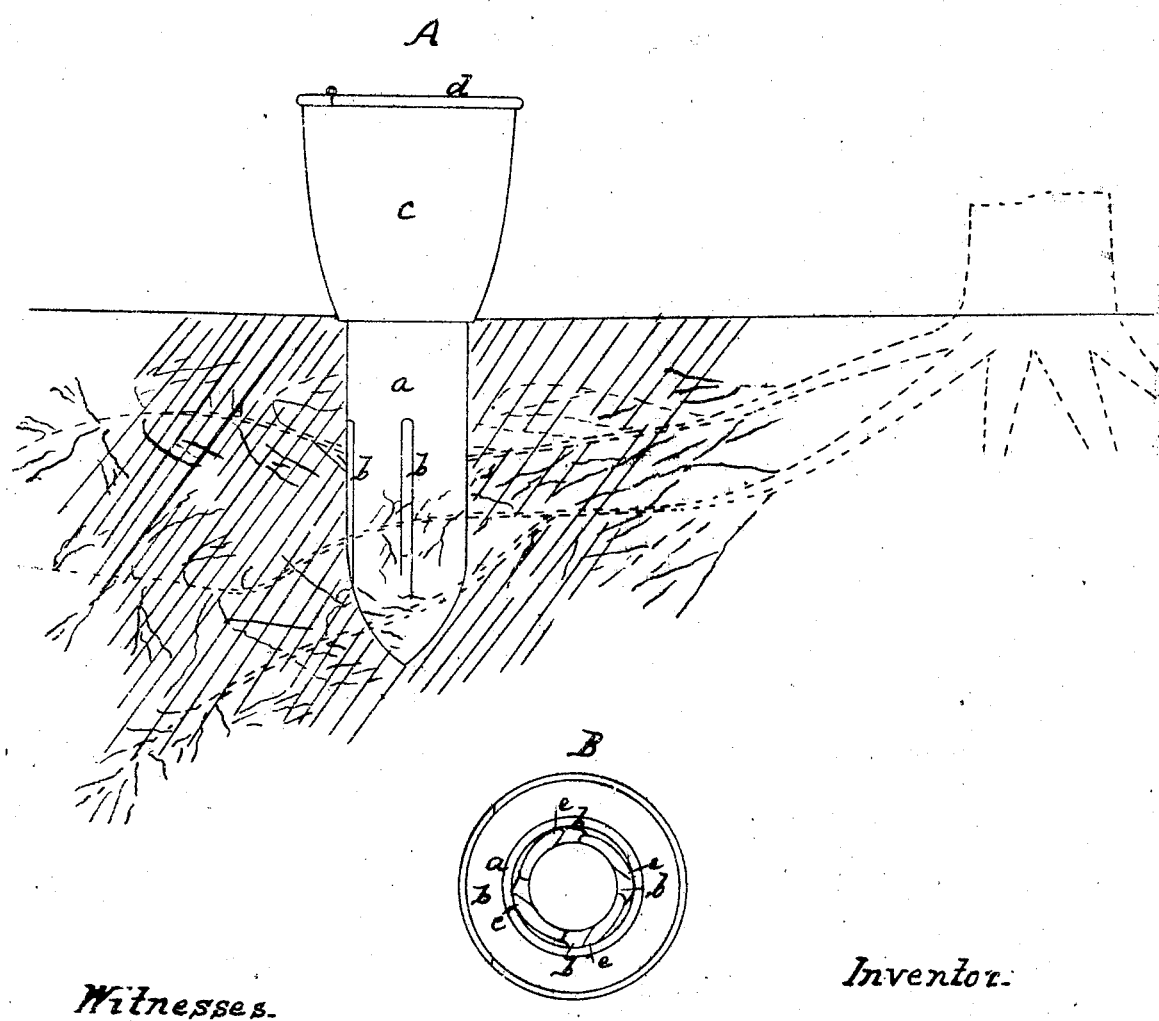
Witnesses.
S. B. Kidder
M. W. Frothingham
Inventor.
John C Fish
by his Attys.
Crosby Halsted & Gould

United States Patent Office.

JOHN C. FISH, OF BARNSTABLE, MASSACHUSETTS.

Letters Patent No. 73,442, dated January 21, 1868.

IMPROVEMENT IN TREE-FEEDING TUBE.

The Schedule referred to in these Letters Patent and making part of the same.

TO ALL WHOM IT MAY CONCERN:

Be it known that I, JOHN C. FISH, of Barnstable, in the county of Barnstable, and State of Massachusetts, have invented an improved Tree-Feeding Tube; and I do hereby declare that the following, taken in connection with the drawings which accompany and form part of this specification, is a description of my invention sufficient to enable those skilled in the art to practise it.

My invention relates to the mode of supplying nourishment to the roots of plants and trees without distributing the same over the surface of the ground.

In the common practice of watering trees and plants, and of enriching the ground about the roots, the water, or fertilizing-matter, is generally applied directly to the surface of the ground about the trunk or stem. This manner of applying manure or other fertilizing-material is objectionable in that it induces the roots of the tree to run towards the surface, so that when, in times of drought, the earth about these roots becomes dry and parched, many of the roots perish for want of moisture, and the tree either dies or becomes stunted; and to so apply water or liquid fertilizers is objectionable, because the liquid either fails to penetrate to the roots, or tends to induce them to or towards the surface of the ground, and also because the liquid causes the earth to bake or crust at the surface, and thus prevents that free admission of air which is necessary to the thriving of the roots of most plants.

My invention consists of a tube so constructed as to be driven into the earth near the trunk of the tree, the tube having a shoe or entering-point at its lower end, and being open at top, preferably with a flaring mouth, to stand above the ground, and also having openings for the escape of liquid poured in at the mouth of the tube.

The drawings represent a tube embodying my invention.

$a$ denotes the part thereof to be driven into the ground, said part being preferably a cast-metal cylinder, having a sharp entering-point at its lower end, the lower end being made close or solid to prevent entrance of earth as the tube is driven. Just above the bottom of the tube, and to some distance from the same, the tube is provided with openings or perforations, which may be made in the form of slits, $b$, as seen at A, or may be simply small holes bored through or made in the cylinder. At the top this tube is preferably surmounted by a mouth-piece, $c$, made in the form of a flaring tube to facilitate the pouring of fluid into the tube, this mouth-piece generally standing above the surface of the ground, thereby enabling the tube to be readily withdrawn when desirable, and being covered by a hinged cap, $d$, as seen at A.

As in driving the tube into the ground, the earth against the sides becomes packed or condensed, and to some degree impenetrable to liquid, the tube may be made irregular in cross-section, or in such manner that the metal on one side of the slit stands out further from the centre of the tube than the metal at the opposite side thereof, as seen at $c$, so that if, after driving, the tube is turned in the direction of the arrow seen at B, the salient edges $e$ will cut into and break up the surface of the earth immediately in contact with or adjacent to the tube to the depth of the slits.

Now, as water or other liquid solution is poured into the tube, it will pass through the slits or openings $b$, and will percolate into the earth about the tube entirely, and to some depth below the surface, thereby feeding the roots at their natural depth, and preventing them from growing towards the temporarily moist, or alternately moist and dry surface of the ground.

Several of these tubes may be placed around a tree, or one of the tubes may be moved from place to place. When permanently located, the tube may be made sufficiently short to be driven entirely into the ground, or so that its top is on, or nearly on, a level with the top of the ground.

I claim a tree-feeding tube, having a construction substantially as set forth.

JOHN C. FISH.

Witnesses:
   FRANCIS GOULD,
   L. H. LATIMER.